(12) United States Patent
Arai et al.

(10) Patent No.: US 12,431,294 B2
(45) Date of Patent: Sep. 30, 2025

(54) MULTILAYER CERAMIC ELECTRONIC COMPONENT

(71) Applicant: TAIYO YUDEN CO., LTD., Tokyo (JP)

(72) Inventors: Norihiro Arai, Tokyo (JP); Kazumichi Hiroi, Tokyo (JP); Hirokazu Shimizu, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 210 days.

(21) Appl. No.: 18/176,792

(22) Filed: Mar. 1, 2023

(65) Prior Publication Data
US 2023/0282423 A1 Sep. 7, 2023

(30) Foreign Application Priority Data
Mar. 7, 2022 (JP) .................. 2022-034023

(51) Int. Cl.
*H01G 4/30* (2006.01)
*H01G 4/012* (2006.01)
*H01G 4/12* (2006.01)

(52) U.S. Cl.
CPC ............. *H01G 4/306* (2013.01); *H01G 4/012* (2013.01); *H01G 4/12* (2013.01)

(58) Field of Classification Search
CPC .......... H01G 4/30; H01G 4/306; H01G 4/012; H01G 4/12
USPC ................ 361/301.4, 321.1, 321.4, 311, 312
See application file for complete search history.

(56) References Cited

U.S. PATENT DOCUMENTS

| | | | | |
|---|---|---|---|---|
| 2004/0233612 A1* | 11/2004 | Sugimoto | ................ | H01G 4/30 361/312 |
| 2010/0195260 A1* | 8/2010 | Ishihara | ................... | H01G 4/30 361/313 |
| 2013/0114182 A1* | 5/2013 | Suh | ........................ | H01G 4/018 361/321.2 |
| 2014/0022692 A1* | 1/2014 | Yoon | ....................... | H01G 4/30 156/322 |

(Continued)

FOREIGN PATENT DOCUMENTS

| | | |
|---|---|---|
| JP | H1-080011 A | 3/1989 |
| JP | 2018-101751 A | 6/2018 |

*Primary Examiner* — Arun Ramaswamy
(74) *Attorney, Agent, or Firm* — CHEN YOSHIMURA LLP

(57) ABSTRACT

A multilayer ceramic electronic component includes a ceramic body, which includes an electrode-stacking portion in which internal electrodes are stacked, and cover portions facing each other in a first axis direction across the electrode-stacking portion, and external electrodes each including a covering portion that covers the ceramic body from a second axis direction, and an extending portion that extends over the cover portions along the second axis direction. The ceramic body includes crystal grains of ceramic and segregated small grains located between the crystal grains. In a cross section of an end section located between the extending portion of the cover portion and the electrode-stacking portion, the number of the segregated small grains having a grain size of 0.5% or greater and 10% or less of an average grain size of the crystal grains is 40% or greater and 95% or less of the number of the crystal grains.

13 Claims, 9 Drawing Sheets

(56) References Cited

U.S. PATENT DOCUMENTS

| | | | |
|---|---|---|---|
| 2016/0049244 A1* | 2/2016 | Kitano | H01G 4/1209 |
| | | | 361/301.4 |
| 2016/0049246 A1* | 2/2016 | Kitano | H01G 4/248 |
| | | | 361/301.4 |
| 2018/0040424 A1* | 2/2018 | Takahashi | C04B 35/64 |
| 2018/0174752 A1 | 6/2018 | Yanagisawa et al. | |
| 2020/0402719 A1* | 12/2020 | Sugawara | H01G 4/248 |
| 2021/0183573 A1* | 6/2021 | Iguchi | C04B 35/481 |
| 2022/0028611 A1* | 1/2022 | Iguchi | H01G 4/30 |
| 2022/0254570 A1* | 8/2022 | Ariizumi | C04B 35/4682 |

* cited by examiner

MULTILAYER CERAMIC ELECTRONIC COMPONENT

FIELD

A certain aspect of the present disclosure relates to a multilayer ceramic electronic component including external electrodes.

BACKGROUND

In multilayer ceramic capacitors, diffusion of hydrogen into the ceramic body may reduce insulation resistance and decrease reliability. Diffusion of hydrogen into the ceramic body is likely to occur when, for example, hydrogen generated in the wet plating process for forming the external electrodes remains while being occluded in the external electrodes.

Japanese Patent Application Laid-Open No. H1-080011 (Patent Document 1) discloses a technique for making it difficult for hydrogen in the external electrodes to diffuse into the ceramic body. In this technique, by adding a metal that has a function of suppressing the absorption of hydrogen to the internal electrodes, hydrogen in the external electrodes is inhibited from diffusing into the ceramic body through paths along the internal electrodes.

In addition, Japanese Patent Application Laid-Open No. 2018-101751 (Patent Document 2) discloses a technique for inhibiting hydrogen from entering the ceramic body from the external electrodes. In this technique, Mo having a function of preventing permeation of hydrogen is added to the base layers of the external electrodes. This inhibits hydrogen generated during the formation of the plated layer on the base layer from entering the ceramic body.

RELATED ART DOCUMENTS

Patent Documents

Japanese Patent Application Laid-Open No. H1-080011
Japanese Patent Application Laid-Open No. 2018-101751

SUMMARY

In recent years, multilayer ceramic electronic components have been installed in in-vehicle electronic devices. Therefore, there is a demand for highly reliable multilayer ceramic electronic components whose insulation resistance is less likely to decrease even in severe environments such as high-temperature environments.

An object of the present disclosure is to provide a multilayer ceramic electronic component with high reliability.

In one aspect of the present disclosure, there is provided a multilayer ceramic electronic component including: a ceramic body including an electrode-stacking portion and first and second cover portions, the electrode-stacking portion including ceramic layers stacked in a first axis direction and internal electrodes disposed between the ceramic layers, the first and second cover portions facing each other in the first axis direction with the electrode-stacking portion interposed therebetween; and first and second external electrodes, each of the first and second external electrodes including a covering portion that covers the ceramic body from a second axis direction orthogonal to the first axis direction, and an extending portion that extends over at least one of the first and second cover portions along the second axis direction, wherein the ceramic body includes crystal grains of ceramic and segregated small grains located between the crystal grains, wherein at least one of the first and second cover portions includes an end section located between the extending portion and the electrode-stacking portion, and wherein in a cross section of the end section, the number of the segregated small grains is 40% or greater and 95% or less of the number of the crystal grains, each of the segregated small grains being defined as a grain having a grain size of 0.5% or greater and 10% or less of an average grain size of the crystal grains in the cross section.

In this configuration, in the cross section of the end section of the cover portion located between the external electrode and the electrode-stacking portion, the number of the segregated small grains having a grain size of 0.5% or greater and 10% or less of the average grain size of the crystal grains is 40% or greater and 95% or less of the number of the crystal grains. As a result, migration of hydrogen released from the external electrode to the end section is inhibited by a large number of the small grains, and a decrease in insulation resistance due to the influence of hydrogen is reduced. In addition, by segregating a large number of the small grains having the above grain size, it is possible to inhibit excessive addition of additives and to reduce defects such as over-sintering of the ceramic body as compared with the case in which a large number of segregated grains having a large grain size are segregated. Therefore, the reliability of the multilayer ceramic electronic component can be enhanced.

The segregated small grains may contain silicon.

The segregated small grains may further contain at least one of a rare earth element or an alkaline earth metal element.

The segregated small grains may be present at triple points formed by three of the crystal grains.

An average grain size of the crystal grains in the cross section of the end section may be 50 nm or greater and 500 nm or less.

The number of the segregated small grains per unit area in a cross section of the ceramic layer in the electrode-stacking portion may be smaller than the number of the segregated small grains per unit area in the cross section of the end section.

This configuration can reduce a decrease in the dielectric constant of the ceramic layer due to the segregated grains.

At least one of the first and second cover portions may include a central section located between the first and second external electrodes in the second axis direction, and in a cross section of the central section, an average grain size of the crystal grains in a surface layer portion in the first axis direction may be larger than an average grain size of the crystal grains in a central portion in the first axis direction.

At least one of the first and second cover portions may include a central section located between the first and second external electrodes in the second axis direction, and in a cross section of the central section, the number of the segregated small grains per unit area in a surface layer portion in the first axis direction may be less than the number of the segregated small grains per unit area in a central portion in the first axis direction.

This configuration reduces the risk of moisture entering from the surface layer portion of the central section that is not covered with the external electrodes. Therefore, a decrease in the insulation resistance of the multilayer ceramic electronic component due to the influence of moisture can be reduced, and the reliability of the multilayer ceramic electronic component can be further improved.

The crystal grains may contain barium and titanium.

The crystal grains may contain at least one of calcium or zirconium.

In another aspect of the present disclosure, there is provided a multilayer ceramic electronic component including: a ceramic body including an electrode-stacking portion and first and second side margin portions, the electrode-stacking portion including ceramic layers stacked in a first axis direction and internal electrodes disposed between the ceramic layers, the first and second side margin portions facing each other in a second axis direction orthogonal to the first axis direction with the electrode-stack portion interposed therebetween; and first and second external electrodes each including a covering portion that covers the ceramic body from a third axis direction orthogonal to the first and second axis directions, and an extending portion that extends over at least one of the first and second side margin portions along the third axis direction, wherein the ceramic body contains crystal grains of ceramic and segregated small grains located between the crystal grains, wherein at least one of the first and second side margin portions includes an end section located between the extending portion and the electrode-stacking portion, and wherein in a cross section of the end section, the number of the segregated small grains is 40% or greater and 95% or less of the number of the crystal grains, each of the segregated small grains being defined as a grain having a grain size of 0.5% or greater and 10% or less of an average grain size of the crystal grains in the cross section.

In this configuration, in the cross section of the end section of the side margin portion located between the external electrode and the electrode-stacking portion, the number of the segregated small grains having a grain size of 0.5% or greater and 10% or less of the average grain size of the crystal grains is 40% or greater and 95% or less of the number of the crystal grains. This also reduces a decrease in insulation resistance due to the influence of hydrogen. Moreover, excessive addition of the additives can be inhibited, and defects such as over-sintering of the ceramic body can be reduced. Therefore, the reliability of the multilayer ceramic electronic component can be enhanced.

DETAILED DESCRIPTION

Figure 1:
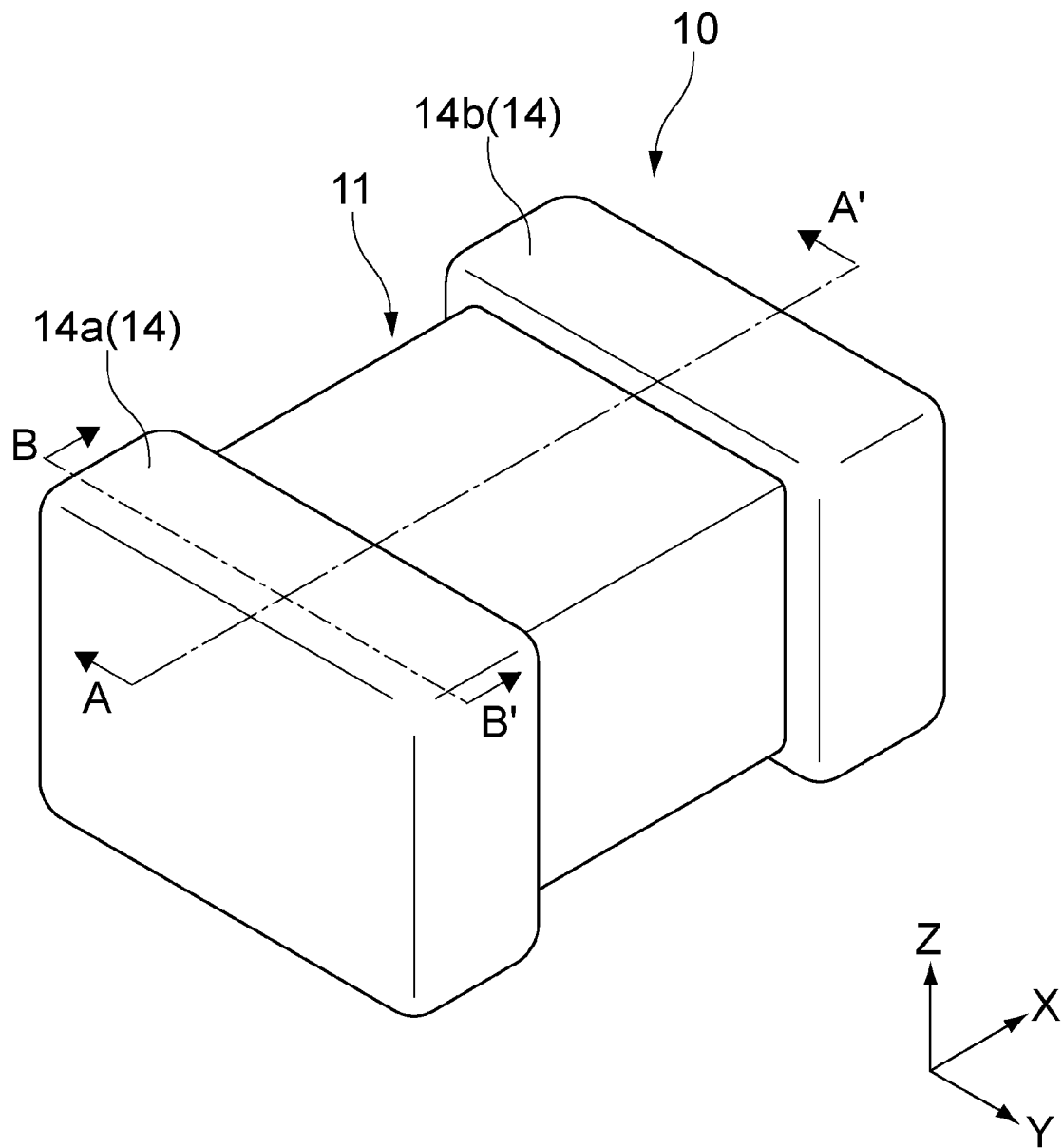
FIG. 1 is a perspective view of a multilayer ceramic capacitor in accordance with a first embodiment.

Hereinafter, embodiments of the present disclosure will be described with reference to the drawings. In the drawings, an X-axis, a Y-axis, and a Z-axis that are orthogonal to each other are illustrated as appropriate. The X axis, the Y axis, and the Z axis define a fixed coordinate system that is fixed with respect to a multilayer ceramic capacitor 10.

[Overall Configuration of Multilayer Ceramic Capacitor]

Figure 2:
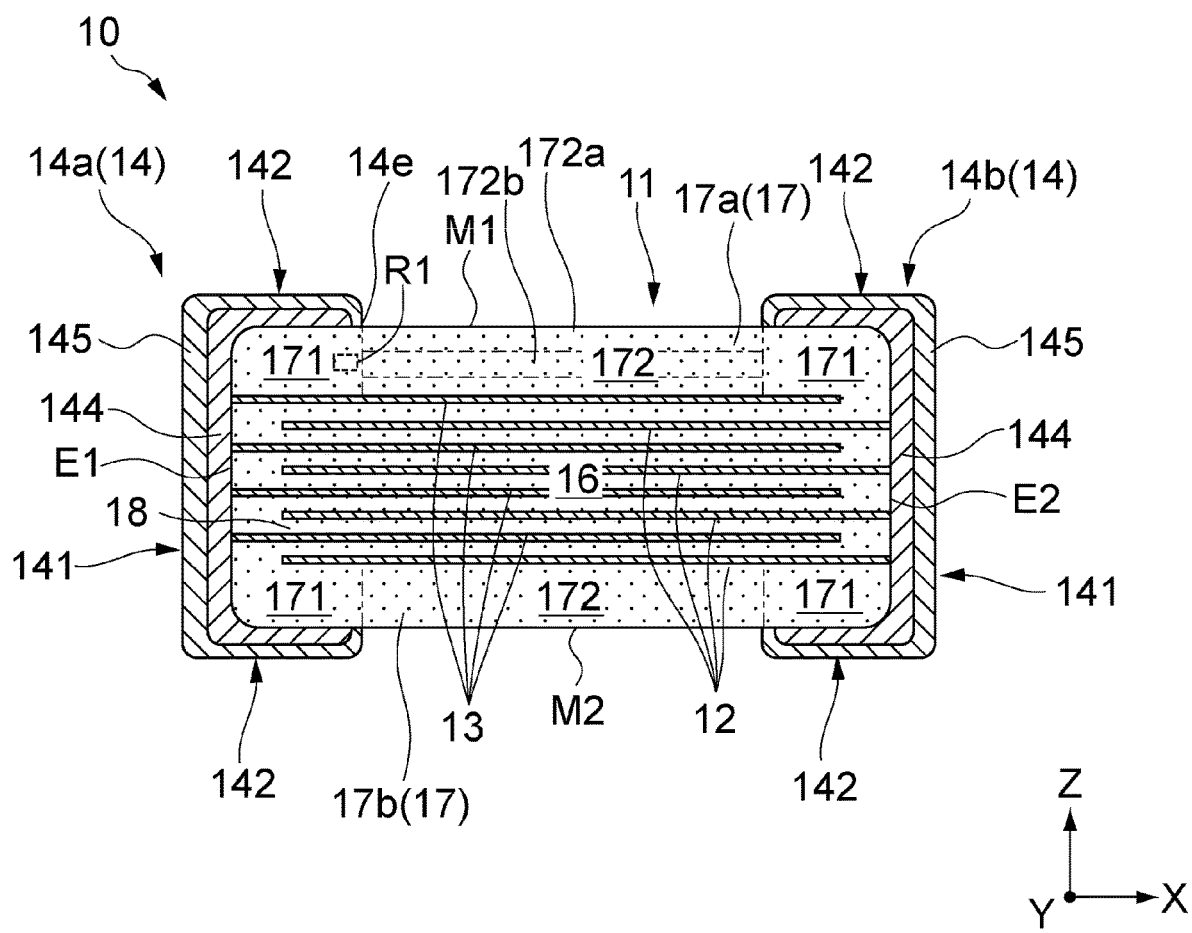
FIG. 2 is a cross-sectional view of the multilayer ceramic capacitor taken along line A-A' in FIG. 1.
Figure 3:
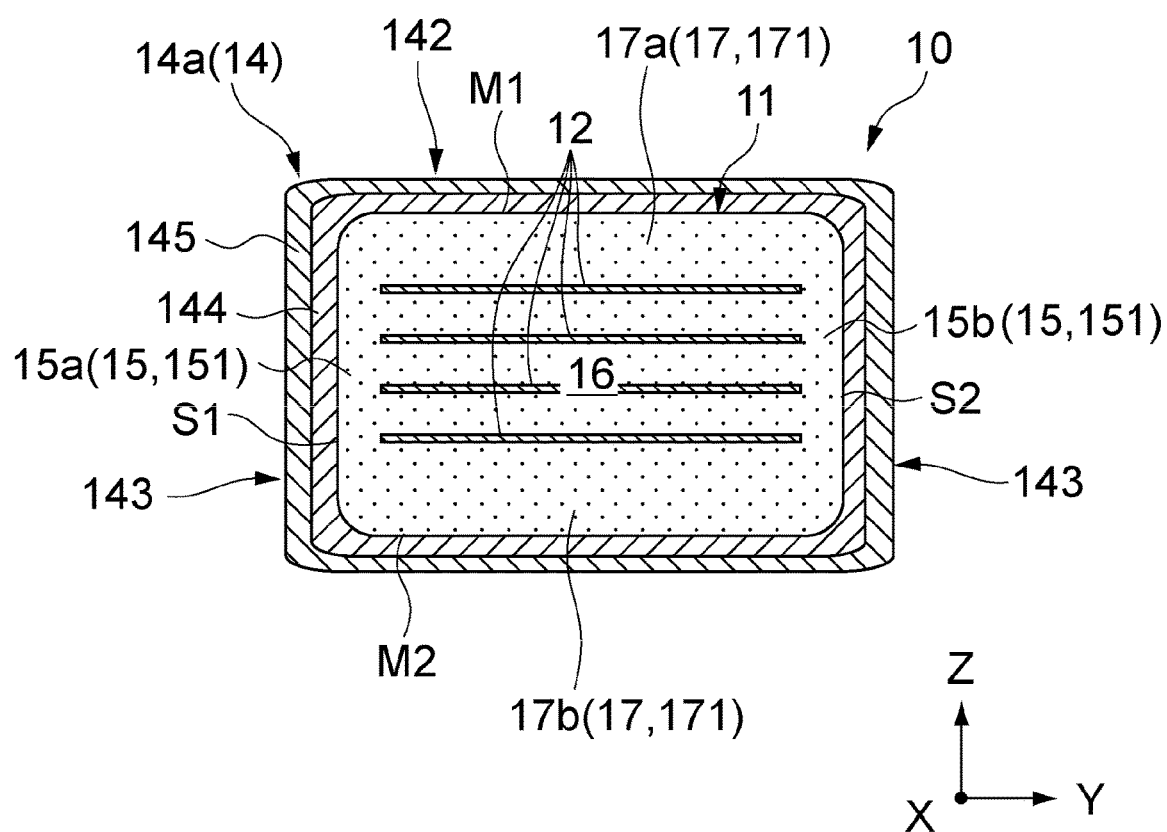
FIG. 3 is a cross-sectional view of the multilayer ceramic capacitor taken along line B-B' in FIG. 1.

FIG. 1 to FIG. 3 illustrate the multilayer ceramic capacitor 10 in accordance with an embodiment. FIG. 1 is a perspective view of the multilayer ceramic capacitor 10. FIG. 2 is a cross-sectional view of the multilayer ceramic capacitor 10 taken along line A-A' in FIG. 1. FIG. 3 is a cross-sectional view of the multilayer ceramic capacitor 10 taken along line B-B' in FIG. 1.

The multilayer ceramic capacitor 10 includes a ceramic body 11, a first external electrode 14a, and a second external electrode 14b. Each of the external electrodes 14a and 14b is also referred to as an external electrode 14.

The ceramic body 11 is configured as a rectangular parallelepiped having a first end surface E1 and a second end surface E2 perpendicular to the X-axis, a first side surface S1 and a second side surface S2 perpendicular to the Y-axis, and a first principal surface M1 and a second principal surface M2 perpendicular to the Z-axis. The "rectangular parallelepiped" may be any shape as long as it is substantially rectangular parallelepiped. For example, the ridge portions connecting the surfaces of the ceramic body 11 may be rounded.

The principal surfaces M1 and M2, the end surfaces E1 and E2, and the side surfaces S1 and S2 of the ceramic body 11 are all flat surfaces. The flat surface according to the present embodiment does not have to be strictly a flat surface as long as it is recognized as flat when viewed as a whole, and includes, for example, a surface having a minute uneven shape on the surface, a surface having a gently curved shape within a predetermined range, and the like.

The multilayer ceramic capacitor 10 of the present embodiment has, for example, the following dimensions. The dimension of the multilayer ceramic capacitor 10 in the X-axis direction is, for example, 0.2 mm or greater and 3.5 mm or less. The dimension of the multilayer ceramic capacitor 10 in the Y-axis direction is, for example, 0.1 mm or greater and 2.8 mm or less. The dimension of the multilayer ceramic capacitor 10 in the Z-axis direction is, for example, 0.1 mm or greater and 2.8 mm or less. The "dimension" in a certain direction of the multilayer ceramic capacitor 10 is the maximum dimension in the certain direction. The multilayer ceramic capacitor 10 in which the dimension in the Z-axis direction is larger than the dimension in the Y-axis direction is a so-called high-height multilayer ceramic capacitor. Since the high-height multilayer ceramic capacitor can effectively utilize the space in the height direction (Z-axis direction), it can be mounted on the mounting substrate in a small space and can obtain a large capacitance.

Further, in the following description, "inner side in the X-axis direction" refers to a side closer to a virtual Y-Z plane that divides the multilayer ceramic capacitor 10 into two equal parts in the X-axis direction, and "outer side in the X-axis direction" refers to the side farther away from the virtual Y-Z plane. The "inner side in the Z-axis direction" refers to a side closer to a virtual X-Y plane that divides the multilayer ceramic capacitor 10 into two equal parts in the Z-axis direction, and the "outer side in the Z-axis direction" refers to a side farther away from the virtual X-Y plane.

The external electrodes 14a and 14b cover respective ends of the ceramic body 11 in the X-axis direction. For example, the first external electrode 14a illustrated in FIG. 1 extends from the first end face E1 of the ceramic body 11 to both principal surfaces M1 and M2 and both side surfaces S1 and S2. The second external electrode 14b illustrated in FIG. 1 extends from the second end surface E2 of the ceramic body 11 to both principal surfaces M1 and M2 and both side surfaces S1 and S2.

The ceramic body 11 includes an electrode-stacking portion 16, a first cover portion 17a, and a second cover portion 17b. The cover portions 17a and 17b are opposed to each other in the Z-axis direction with the electrode-stacking portion 16 interposed therebetween, and define the principal surfaces M1 and M2 of the ceramic body 11, respectively. Each of the cover portions 17a and 17b is also referred to as a cover portion 17.

The thickness of each cover portion 17 in the Z-axis direction is, for example, 5 μm or greater and 300 μm or less to achieve miniaturization while ensuring insulation. The thickness of each cover portion 17 in the Z-axis direction is the maximum dimension of each cover portion 17 in the Z-axis direction.

The ceramic body 11 may further include a first side margin portion 15a and a second side margin portion 15b opposed to each other in the Y-axis direction with the electrode-stacking portion 16 interposed therebetween. Each of the side margin portions 15a and 15b is also referred to as a side margin portion 15. With this configuration, the insulation property of the end portion of the electrode-stacking portion 16 in the Y-axis direction is ensured.

The electrode-stacking portion 16 includes ceramic layers 18 stacked in the Z-axis direction and internal electrodes 12 and 13 disposed between the ceramic layers 18. The first internal electrodes 12 and the second internal electrodes 13 are alternately arranged in the Z-axis direction with the ceramic layers 18 interposed therebetween. In the present embodiment, the ceramic layer 18 and the internal electrodes 12 and 13 are all formed in a sheet shape extending along the X-Y plane.

The first internal electrodes 12 are led out to the first end surface E1 covered with the first external electrode 14a. On the other hand, the second internal electrodes 13 are led out to the second end surface E2 covered with the second external electrode 14b. Thereby, the first internal electrodes 12 are connected only to the first external electrode 14a, and the second internal electrodes 13 are connected only to the second external electrode 14b.

With such a configuration, in the multilayer ceramic capacitor 10, when a voltage is applied between the external electrodes 14a and 14b, the voltage is applied to the plurality of the ceramic layers 18 between the internal electrodes 12 and 13. As a result, an electric charge corresponding to the voltage between the external electrodes 14a and 14b is stored in the multilayer ceramic capacitor 10.

Each of the internal electrodes 12 and 13 contains a metal material as a main component. Typical examples of the metal material include nickel (Ni), and other examples include copper (Cu), palladium (Pd), platinum (Pt), silver (Ag), gold (Au), and alloys thereof.

The thickness of each of the internal electrodes 12 and 13 in the Z-axis direction is, for example, 0.5 μm or greater and 2.0 μm or less. The thickness of each of the internal electrodes 12 and 13 is the average value of the thicknesses measured at multiple locations of each of the internal electrodes 12 and 13. As an example, six layers are selected from the internal electrodes 12 and 13 in the field of view observed by a scanning electron microscope (SEM) or a transmission electron microscope (TEM), and the thickness is measured at five equally spaced locations in each layer. Then, the average value of the obtained thicknesses at 30 locations is determined to be the thickness of each of the internal electrodes 12 and 13.

The thickness of each ceramic layer 18 in the Z-axis direction is, for example, 0.4 μm or greater and 15 μm or less. This configuration can make the thickness of each ceramic layer 18 in the Z-axis direction equal to or greater than the grain size of the crystal grain of the dielectric ceramic, which will be described later, and can increase the capacitance. The thickness of the ceramic layer 18 is the average value of thicknesses measured at multiple locations of the ceramic layer 18. As an example, six layers are selected from the ceramic layers 18 in the field of view observed by the SEM or TEM, and the thickness is measured at five equally spaced locations in each layer. Then, the average value of the obtained thicknesses at 30 locations is determined to be the thickness of the ceramic layer 18.

The ceramic body 11 contains a dielectric ceramic as a main component. The dielectric ceramic contained in the ceramic body 11 has, for example, a perovskite structure represented by the general formula $ABO_3$. Examples of the dielectric ceramic having a perovskite structure include a material containing barium (Ba) and titanium (Ti), typified by barium titanate ($BaTiO_3$). The dielectric ceramic having a perovskite structure may be a material containing at least one of calcium (Ca) or zirconium (Zr).

Specifically, instead of barium titanate, the dielectric ceramic may be strontium titanate ($SrTiO_3$), calcium titanate ($CaTiO_3$), magnesium titanate ($MgTiO_3$), calcium zirconate ($CaZrO_3$), calcium zirconate titanate ($Ca(Ti, Zr, Ti)O_3$), barium calcium zirconate titanate ($(Ba, Ca)(Ti, Zr)O_3$), barium zirconate ($BaZrO_3$), titanium oxide ($TiO_2$), or the like. The ceramic body 11 may contain dielectric ceramic of a plurality of composition systems.

Furthermore, the ceramic body 11 may contain accessory components in addition to the dielectric ceramic. For example, the ceramic body 11 may contain silicon (Si) as an accessory component to improve sinterability and reduce structural defects. Furthermore, the ceramic body 11 may contain at least one of a rare earth element or an alkaline earth metal element. Examples of the rare earth element include yttrium (Y), lanthanum (La), cerium (Ce), praseodymium (Pr), samarium (Sm), neodymium (Nd), europium (Eu), gadolinium (Gd), terbium (Tb), dysprosium (Dy), holmium (Ho), erbium (Er), and ytterbium (Yb). Examples of the alkaline earth metal element include magnesium (Mg), calcium (Ca), strontium (Sr), and barium (Ba). Furthermore, the ceramic body 11 may contain vanadium (V), manganese (Mn), lithium (Li), sodium (Na), potassium (K), and other elements as accessory components.

The ceramic layer 18, the cover portion 17, and the side margin portion 15 may have the same composition or different compositions. To reduce the stress caused by the difference in physical properties between the electrode-stacking portion 16 and its surroundings, the cover portion 17 and/or the side margin portion 15 preferably contains a dielectric ceramic having the same composition as the ceramic layer 18.

[Structure of External Electrodes]

Each of the first and second external electrodes 14a and 14b in the present embodiment includes a covering portion 141 that covers the ceramic body 11 from the X-axis direction and a first extending portion 142 that extends over the cover portion 17 along the X-axis direction. Each of the first and second external electrodes 14a and 14b in the present embodiment further includes a second extending portion 143 that extends over the side margin portion 15 along the X-axis direction. Note that the first extending portion 142 is also referred to as the extending portion 142 in the present embodiment.

In the present embodiment, the external electrode 14 has a plurality of layers. Specifically, the external electrode 14 has a base layer 144 disposed on the ceramic body 11 and a plated layer 145 disposed on the base layer 144.

The base layer 144 may be configured as, for example, a sintered metal film obtained by baking a conductive metal paste, or may have a multilayer structure of a sintered metal film and a sputtered film. For example, the base layer 144 may contain at least one of nickel (Ni), copper (Cu), palladium (Pd), platinum (Pt), silver (Ag), gold (Au), or alloys thereof.

The plated layer 145 includes one or more plated films. Each plated film of the plated layer 145 may contain, for example, at least one of copper (Cu), nickel (Ni), tin (Sn), palladium (Pd), platinum (Pt), silver (Ag), gold (Au), or an alloy thereof as a main component.

It is known that hydrogen generated in the wet plating process for forming the plated layer 145 is occluded by the external electrode 14. The hydrogen can take various states such as hydrogen atoms, hydrogen ions, and hydrogen isotopes.

By applying a voltage between the external electrodes 14a and 14b, the hydrogen occluded in the external electrodes 14a and 14b diffuses into the ceramic body 11 under the influence of the electric field. The influence of hydrogen deteriorates the ceramic body 11, and the insulation resistance of the multilayer ceramic capacitor 10 may decrease.

In the present embodiment, the cover portion 17 includes first end sections (end sections) 171 located between the extending portions 142 of the respective external electrodes 14 and the electrode-stacking portion 16. In particular, the end section 171 is likely to be a migration path of hydrogen from the extending portion 142 to the electrode-stacking portion 16. The inventors have found that by segregating a large number of small grains with a predetermined size in the end section 171 of the cover portion 17, it is possible to reduce a decrease in insulation resistance of the multilayer ceramic capacitor 10. Details of the microstructure of the ceramic body 11 will be described below.

[Microstructure of Ceramic Body]

Figure 4:
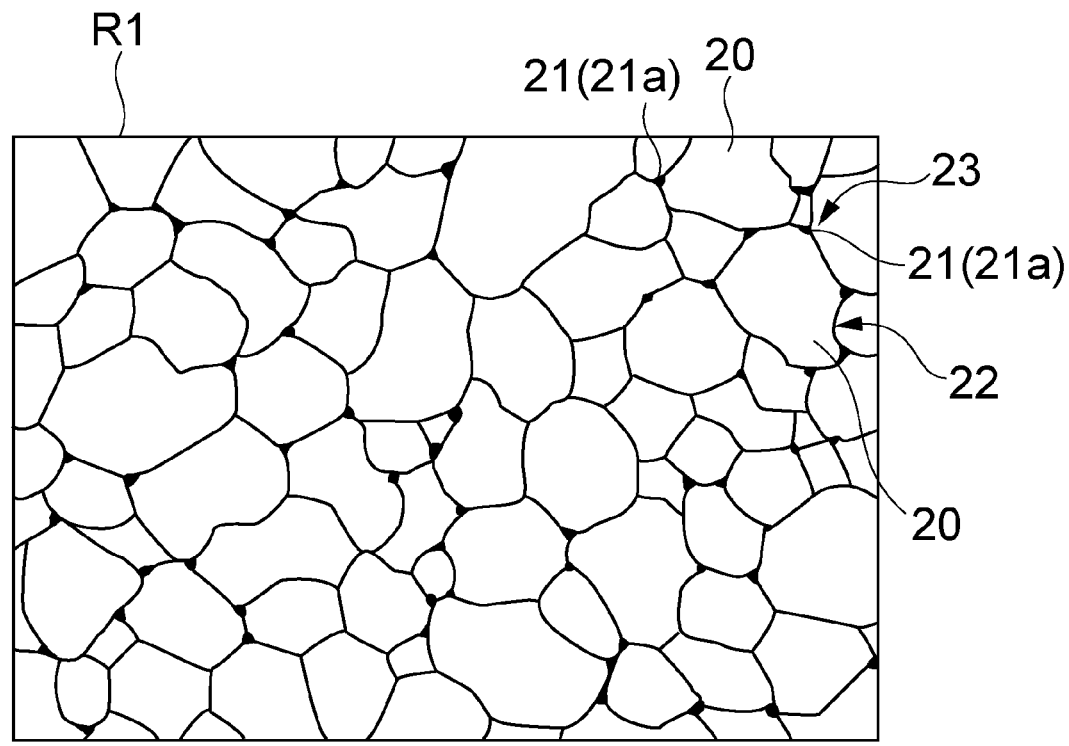
FIG. 4 schematically illustrates the microstructure of a section R1 in FIG. 2.

FIG. 4 is a partial cross-sectional view schematically illustrating the microstructure of the ceramic body 11, illustrating the section R1 within the end section 171 illustrated in FIG. 2.

Figure 5:
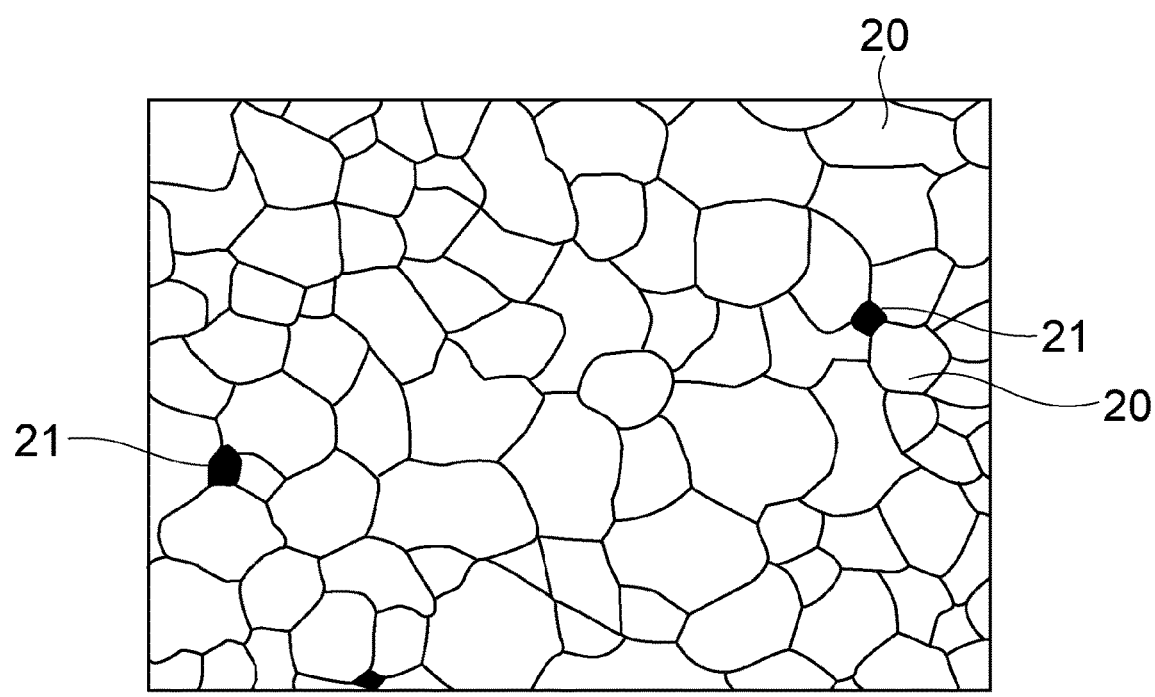
FIG. 5 schematically illustrates the microstructure of a ceramic body of a multilayer ceramic capacitor in accordance with a comparative example.

The ceramic body 11 including the ceramic layers 18, the cover portions 17, and the side margin portions 15 is a polycrystalline body including crystal grains 20 of dielectric ceramic. In FIG. 4 and FIG. 5, which will be described later, the crystal grains 20 are illustrated as large white grains that are densely arranged throughout.

The crystal grains 20 contain the dielectric ceramic described above as a main component and have a crystal structure such as a perovskite structure. For example, the crystal grains 20 contain barium (Ba) and titanium (Ti) as elements constituting the dielectric ceramic, and may contain, for example, barium titanate ($BaTiO_3$). The crystal grains 20 may further contain at least one of calcium (Ca) or zirconium (Zr) as an element constituting the dielectric ceramic. The crystal grains 20 of the ceramic layers 18, the cover portions 17, and the side margin portions 15 preferably contain the same dielectric ceramic, but may contain different dielectric ceramics.

In the ceramic body 11, during the firing process, the raw material ceramic particles are aggregated to form a polycrystalline body in which the crystal grains 20 are densely arranged. In the ceramic body 11, crystal grain boundaries 22 are formed between the crystal grains 20, and a triple point 23 is formed in a gap surrounded by three or more crystal grains 20. In addition, in the present embodiment, the "triple point 23" is not limited to the gap surrounded by three crystal grains 20, but also includes the gap surrounded by four or more crystal grains 20.

Furthermore, the ceramic body 11 contains segregated grains 21 located between the crystal grains 20. The segregated grains 21 are formed by segregation of elements such as accessory components that are not contained in the crystal grains 20 during the firing process of the ceramic body 11. In FIG. 4 and FIG. 5, the segregated grains 21 are illustrated as black granular structures.

The segregated grains 21 have a composition according to the accessory components added to the ceramic body 11, and contain Si, for example. Furthermore, the segregated grains 21 may contain at least one of the rare earth elements or alkaline earth metal elements listed as the accessory components above. The segregated grains 21 are, for example, oxides, but are not limited to this. The segregated grains 21 may have a crystalline structure, or may be amorphous.

Since a gap is likely to be formed among the crystal grains 20 at the triple point 23, segregation substances are likely to be generated. Therefore, the segregated grains 21 are often present at the triple points 23, and in such cases, the segregated grains 21 hardly diffuse and are stable with respect to the thermal history and the temporal history, but they may also be present at the crystal grain boundaries 22.

The formation of the segregated grains 21 between the crystal grains 20 can be confirmed by, for example, performing elemental analysis such as scanning electron microscope-energy dispersive X-ray analysis (SEM-EDX), transmission electron microscope-energy dispersive X-ray analysis (TEM-EDX), or wavelength dispersive X-ray analysis (WDX) on a cross section of the multilayer ceramic capacitor 10.

It is considered that when a voltage is applied between the external electrodes 14a and 14b, hydrogen moves through crystal defects in the crystal grains 20 in the ceramic body 11. If the segregated grains 21 are arranged between adjacent crystal grains 20, hydrogen is less likely to enter the segregated grains 21, and therefore, hydrogen moves so as to avoid the segregated grains 21. Therefore, by arranging the segregated grains 21 between the crystal grains 20, which serve as the movement paths of hydrogen, it is possible to inhibit the linear movement of hydrogen and delay the time until hydrogen reaches the electrode-stacking portion 16.

On the other hand, as illustrated in the microstructure of FIG. 5 in accordance with a comparative example of the present embodiment, in the case that the segregated substances are aggregated to form the segregated grains 21 having a large grain size, the segregated grains 21 are not arranged in a dispersed manner, and it is difficult to obtain the effect of inhibiting the migration of hydrogen. Furthermore, in order to form a large number of the segregated grains 21 having such a large grain size, it is necessary to add an excessive amount of accessory components, which may cause problems such as over-sintering of the ceramic body 11.

Therefore, in the present embodiment, by arranging a large number of the segregated grains 21 with a low aggregation degree and a small grain size between the crystal grains 20, the migration of hydrogen can be effectively inhibited.

A small grain 21a having a grain size of 0.5% or greater and 10% or less of the average particle size of the crystal grains 20 is defined as the segregated grain 21 with a small grain size. Specifically, in the cross section of the end section 171 of the cover portion 17 in the present embodiment, when the number of the crystal grains 20 is defined as 100%, the number of the small grains 21a is 40% or greater and 95% or less of the number of the crystal grains 20.

In the present embodiment, the cross section of each portion of the ceramic body 11 is, for example, a cross section parallel to the Z-axis direction, and is preferably a cross section parallel to the X-axis direction and the Z-axis direction (a cross section parallel to the X-Z plane) as illustrated in FIG. 2.

The segregated grains 21 having a grain size smaller than 0.5% of the average grain size of the crystal grains 20 are too small in size to count, and in addition, the effect of inhibiting the diffusion of hydrogen is hardly obtained. On the other hand, in order to form a large number of the segregated grains 21 with a grain size larger than 10% of the average grain size of the crystal grains 20, it is necessary to excessively add the accessory component as described above. Therefore, by forming a large number of the small grains 21a each having a grain size of 0.5% or greater and 10% or less of the average grain size of the crystal grains 20 in the end section 171, it is possible to reduce adverse effects of hydrogen while reducing defects in the ceramic body 11 due to excessive addition of the accessory component.

By adjusting the number ratio of the small grains 21a to the crystal grains 20 to be 40% or greater in the cross section of the end section 171, it is possible to sufficiently lengthen the time until the deterioration in insulating resistance starts in the high temperature load test as described in examples described later. As a result, it is possible to obtain a highly reliable multilayer ceramic capacitor 10 that is less likely to deteriorate even in a severe environment. Further, by adjusting the number ratio of the small grains 21a to the crystal grains 20 to be, for example, 70% or greater, the deterioration in insulating resistance can be more effectively inhibited.

Since it is practically difficult to increase the number ratio of the small grains 21a to the crystal grains 20 to more than 95%, in the present embodiment, the number ratio of the small grains 21a to the crystal grains 20 in the cross section of the end section 171 is adjusted to be 95% or less.

A method of calculating the number ratio of the small grains 21a (small-grain number ratio) when the number of the crystal grains 20 is defined as 100% in the present embodiment will be described.

First, a cross section of the cover portion 17 is exposed by polishing or the like of the ceramic body 11. This cross section is, for example, a cross section that is parallel to the X-Z plane and passes through a central portion of the ceramic body 11 in the Y-axis direction. Subsequently, the cross section is magnified 10,000 to 100,000 times using the SEM or TEM, and the end section 171 of the cover portion 17 is observed. The location to be observed may be, for example, the central portion of the end section 171 in the Z-axis direction, such as the section R1 in FIG. 2. Further, the location to be observed may be between an end portion 14e (see FIG. 2) of the extending portion 142 in the X-axis direction and the electrode-stacking portion 16. However, the location to be observed is not limited to this.

A region containing 50 or more crystal grains 20 is determined as an observation target region for which the small-grain number ratio is to be calculated, and is imaged. The observation target region is preferably one visual field, but may be a region consisting of a plurality of continuous visual fields. The crystal grains 20 that are only partially present in the observation target region are not counted.

Figure 6:
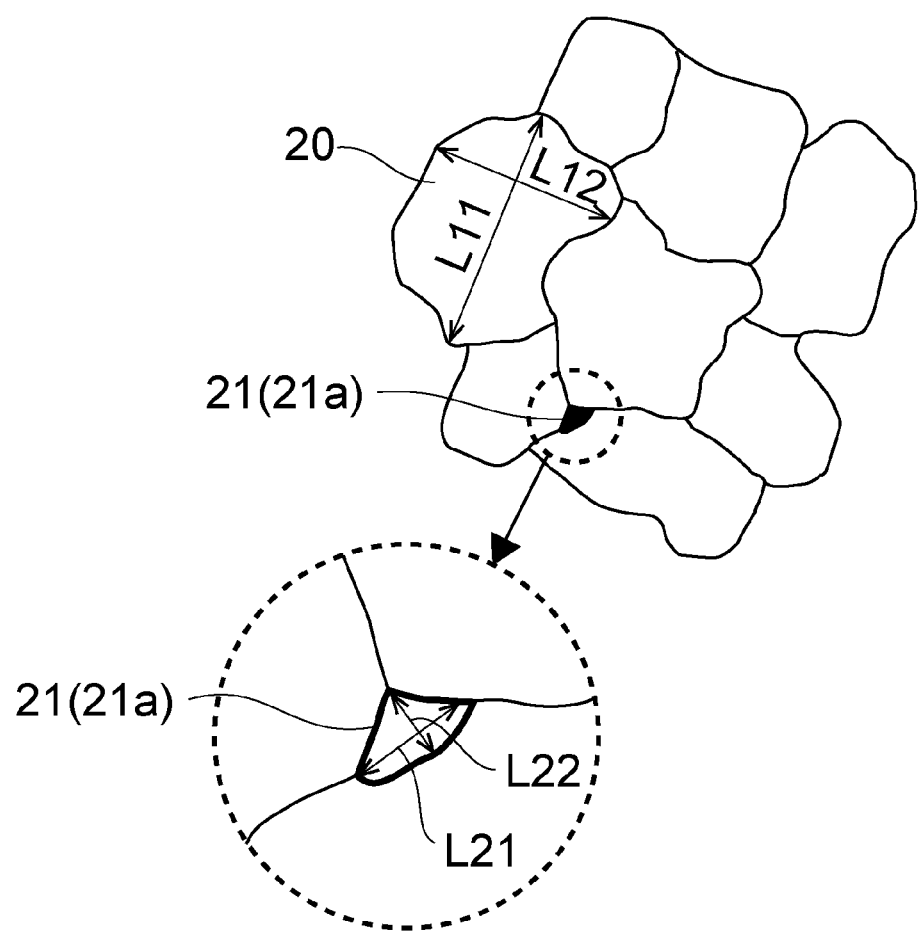
FIG. 6 is a further enlarged view of a part of FIG. 4.

Subsequently, the average grain size of the crystal grains 20 is calculated using the image of the observation target region. First, as illustrated in FIG. 6, the longest dimension L11 of one crystal grain 20 is measured, and the longest widthwise dimension L12 in the direction perpendicular to the line segment defining the longest dimension L11 is measured. The average value of the longest dimension L11 and the widthwise dimension L12 is defined as the grain size of the grain. The average grain size of 50 crystal grains 20 in the observation target region is calculated, and the calculated value is defined as the average grain size of the crystal grains 20.

Subsequently, the grain size of each of the segregated grains 21 present between the crystal grains 20 in the observation target region is calculated by the same method as that for the crystal grains 20. Specifically, as illustrated in an enlarged view surrounded by a broken line in FIG. 6, the longest dimension L21 of one segregated grain 21 is measured, and the longest widthwise dimension L22 in a direction perpendicular to the line segment defining the longest dimension L21 is measured. The average value of the longest dimension L21 and the widthwise dimension L22 is defined as the grain size of the segregated grain 21.

Then, the number of the small grains 21a each having a grain size of 0.5% or greater and 10% or less of the average grain size of the crystal grains 20 among all the segregated grains 21 in the observation target region is counted. However, the small grains 21a that are only partially present in the observation target region are not counted. Finally, the number ratio of the small grains 21a (the number of small grains/the number of crystal grains×100) when the number of the crystal grains 20 in the observation target region is 100% is calculated.

The average grain size of the crystal grains 20 in the cross section of the end section 171 calculated based on the above method is, for example, 50 nm or greater and 500 nm or less, and for example, preferably 170 nm or greater and 250 nm or less. The segregated grains 21 tend to aggregate with growth of the crystal grains 20 during the firing process. Therefore, by adjusting the average grain size of the crystal grains 20 in the cross section of the end section 171 to be, for example, 50 nm or greater and 500 nm or less, the aggregation of the segregated grains 21 in the end section 171 is inhibited, and the number ratio of the small grains 21a is easily adjusted to be 40% or greater. In particular, by adjusting the average grain size of the crystal grains 20 in the cross section of the end section 171 to be 170 nm or greater and 250 nm or less, the number ratio of the small grains 21a can be sufficiently increased and a decrease in insulating resistance can be more effectively reduced as described in examples described later.

On the other hand, when a large number of the segregated grains 21 are formed in the ceramic layer 18, the dielectric constant of the ceramic layer 18 may decrease, and the capacitance of the multilayer ceramic capacitor 10 may decrease.

Therefore, in the present embodiment, the number of the segregated grains 21 per unit area in the cross section of the ceramic layer 18 is preferably smaller than the number of the segregated grains 21 per unit area in the cross section of the end section 171. This configuration can improve the reliability while maintaining the capacitance of the multilayer ceramic capacitor 10.

The number of the segregated grains 21 in the ceramic layer 18 can also be counted in the same manner as in the end section 171 described above. Specifically, a cross section is exposed from the multilayer ceramic capacitor 10 by the method described in the "method for calculating the number ratio of small grains". This cross section may be the cross section used for calculating the small-grain number ratio. Using the SEM or TEM, the cross section is magnified 10,000 to 100,000 times, and an observation target region containing 50 or more crystal grains 20 is imaged. The number of the segregated grains 21 contained in the observation target region of each of the end section 171 and the ceramic layer 18 is counted. However, the segregated grains 21 that are only partially present in the observation target region are not counted. Subsequently, the area of each observation target region is calculated, and the counted number of the segregated grains 21 is divided by the calculated area. Thereby, the number of the segregated grains 21 per unit area in each of the end section 171 and the ceramic layer 18 can be calculated.

On the other hand, the cover portion 17 includes a central section 172 located between the external electrodes 14a and 14b in the X-axis direction. Since the central section 172 is not covered with the external electrodes 14, the risk of diffusion of hydrogen from the external electrodes 14 is low, but the risk of moisture entering from the outside of the multilayer ceramic capacitor 10 is high. Therefore, in the present embodiment, by configuring the central section 172 as described below in addition to the configuration of the end section 171 described above, it is possible to reduce a decrease in insulation resistance due to the entry of moisture, and to further improve the reliability of the multilayer ceramic capacitor 10.

Specifically, in the cross section of the central section 172, the average grain size of the crystal grains 20 in a surface layer portion 172a in the Z-axis direction is preferably larger than the average grain size of the crystal grains 20 in a center portion 172b in the Z-axis direction.

Such a configuration can be achieved, for example, by forming the cover portion 17 with a plurality of ceramic sheets and adjusting the average grain size of the ceramic grains of the ceramic sheet at a position corresponding to the surface layer portion 172a in the Z-axis direction to be larger than the average grain size of the ceramic grains of the ceramic sheet at a position corresponding to the central portion 172b in the Z-axis direction. The surface layer portions 172a in the Z-axis direction of the central section 172 are parts including the respective principal surfaces M1 and M2 among three equal parts obtained by equally dividing the central section 172 into three in the Z-axis direction. The central portion 172b in the Z-axis direction of the central section 172 is the central part of the three equal parts of the central section 172 in the Z-axis direction.

As a result, the crystal grains 20 in the surface layer portion 172a in the Z-axis direction of the central section 172 grow and are arranged more densely, and the risk of moisture entering from the outside of the multilayer ceramic capacitor 10 can be reduced.

As described above, since the grain growth of the crystal grains 20 and the aggregation degree of the segregated grains 21 are related to each other, the number of the segregated grains 21 per unit area in the surface layer portion 172a in the Z-axis direction is preferably smaller than the number of the segregated grains 21 per unit area in the central portion 172b in the Z-axis direction in the cross section of the central section 172.

A method of comparing the number of the segregated grains 21 per unit area in the surface layer portion 172a in the Z-axis direction and the number of the segregated grains 21 per unit area in the central portion 172b in the Z-axis direction of the central section 172 will be described.

A cross section is exposed from the multilayer ceramic capacitor 10 by the method described in the "method for calculating the number ratio of small grains". This cross section may be the cross section used for calculating the small-grain number ratio. Subsequently, the cross section is magnified 10,000 to 100,000 times using an SEM or a TEM, and a region including 50 or more crystal grains 20 is imaged as an observation target region in each of the surface layer portion 172a in the Z-axis direction and the central portion 172b in the Z-axis direction of the central section 172.

Then, in each of the surface layer portion 172a in the Z-axis direction and the center portion 172b in the Z-axis direction of the central section 172, the average grain size of the crystal grains 20 included in the imaged observation target region is calculated. The method for calculating the average grain size of the crystal grains 20 is the method described in the "method for calculating the number ratio of small grains". Thereby, in the cross section of the central section 172, the average grain size of the crystal grains 20 in the surface layer portion 172a in the Z-axis direction and the average grain size of the crystal grains 20 in the central portion 172b in the Z-axis direction can be compared.

Then, the number of all segregated grains 21 contained in the observation target region of each of the surface layer portion 172a in the Z-axis direction and the center portion 172b in the Z-axis direction of the central section 172 is counted. However, the segregated grains 21 that are only partially present in the observation target region are not counted. Subsequently, the area of each observation target region is calculated, and the counted number of the segregated grains 21 is divided by the calculated area. Thereby, the number of the segregated grains 21 per unit area in the cross section of each of the surface layer portion 172a in the Z-axis direction and the center portion 172b in the Z-axis direction of the central section 172 can be calculated.

[Manufacturing Method of Multilayer Ceramic Capacitor]

Figure 7:
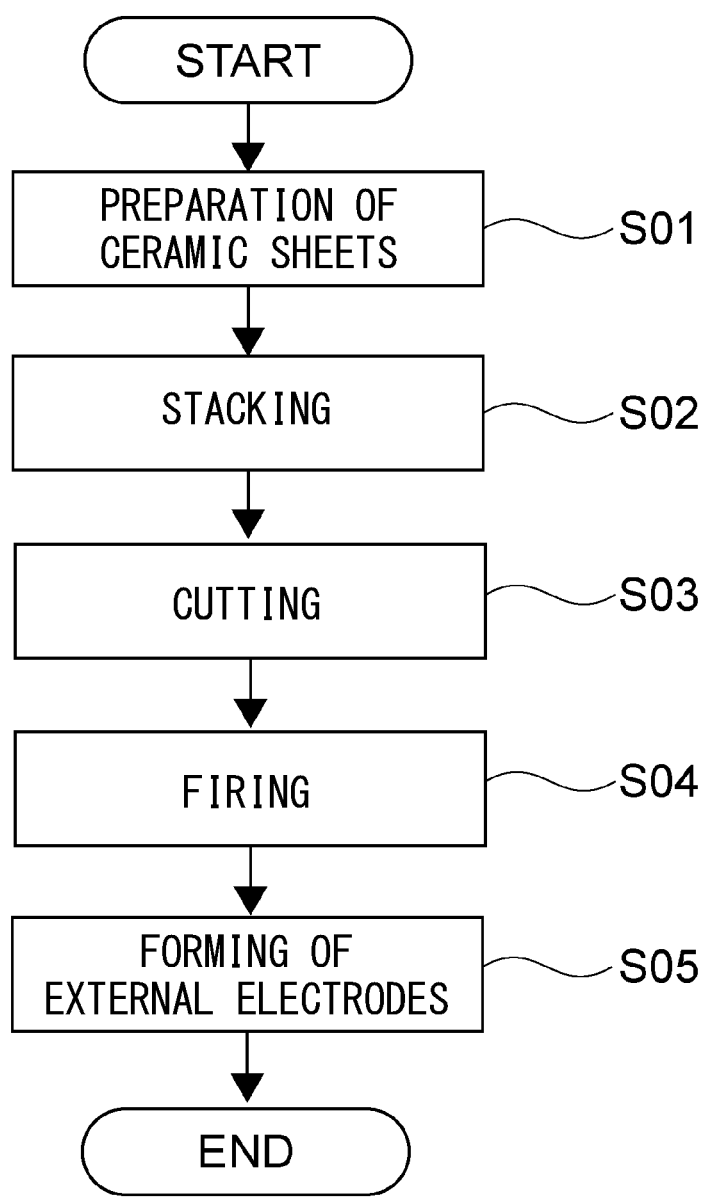
FIG. 7 is a flowchart illustrating a method of manufacturing the multilayer ceramic capacitor.
Figure 8A:
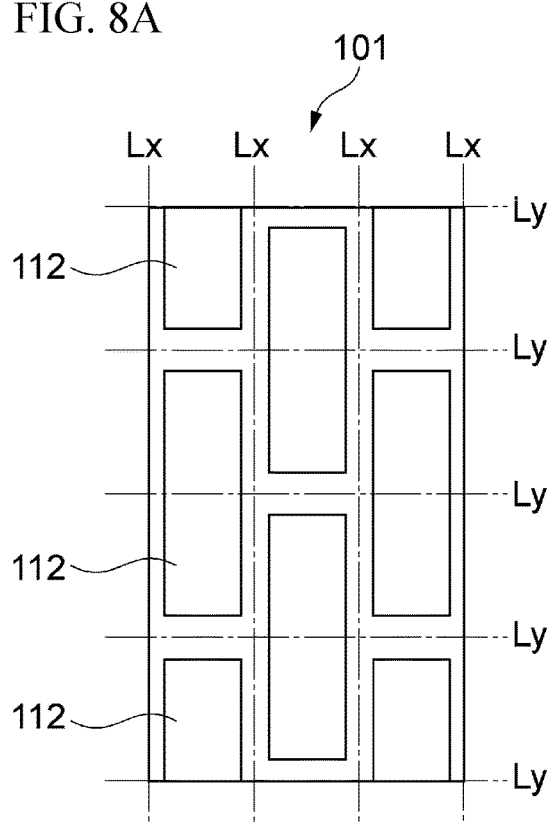
FIG. 8A to FIG. 8C are plan views illustrating a manufacturing process of the multilayer ceramic capacitor.

FIG. 7 is a flowchart illustrating a method of manufacturing the multilayer ceramic capacitor 10. FIG. 8A to FIG. 9 illustrate a manufacturing process of the multilayer ceramic capacitor 10. Hereinafter, a method of manufacturing the multilayer ceramic capacitor 10 will be described along FIG. 7 with appropriate reference to FIG. 8A to FIG. 9.

(Step S01: Preparation of Ceramic Sheets)

In step S01, first ceramic sheets 101 and second ceramic sheets 102 for forming the electrode-stacking section 16, and cover ceramic sheets 103 for forming the cover portion 17 are prepared. The ceramic sheets 101, 102, and 103 are configured as large sheets having regions corresponding to a plurality of the ceramic bodies 11.

Figure 8B:
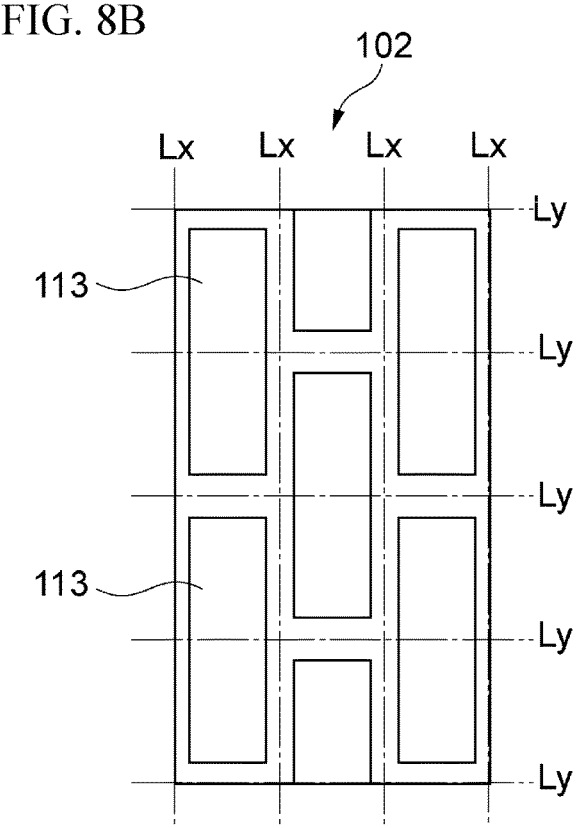
Figure 8C:
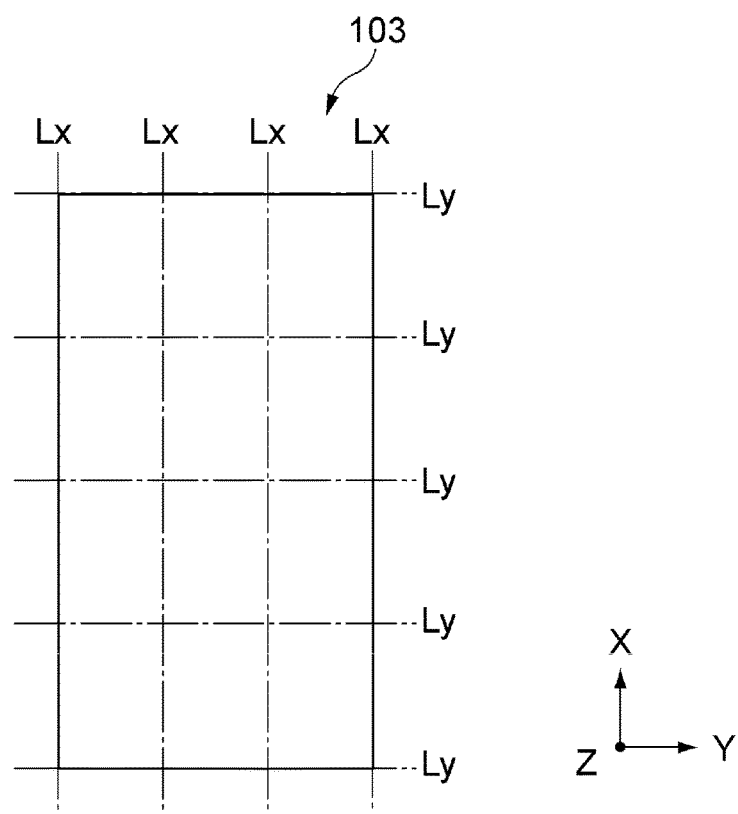
Figure 9:
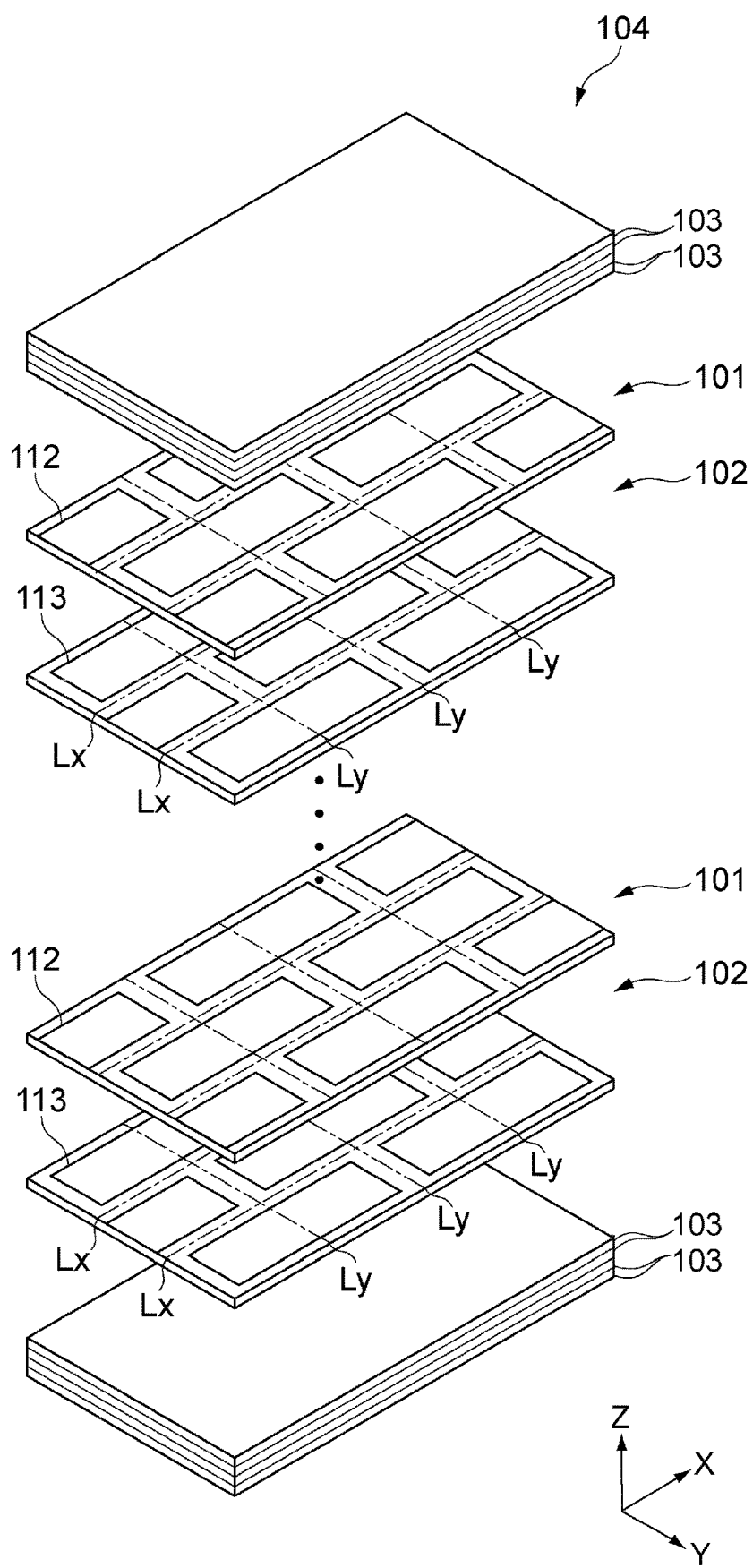
FIG. 9 is a perspective view illustrating the manufacturing process of the multilayer ceramic capacitor.

The ceramic sheets 101, 102, and 103 illustrated in FIG. 8A, FIG. 8B, and FIG. 8C, respectively, are configured as unfired ceramic green sheets. First, materials for the ceramic green sheet are mixed to obtain slurry. The materials include dielectric ceramic powder, binder resin, organic solvent, and additives. A slurry obtained by mixing these materials with a ball mill or the like is formed into a sheet by using a roll coater, a doctor blade, or the like. The ceramic sheets 101 and 102 and the cover ceramic sheet 103 may have the same composition or may have different compositions.

In the present embodiment, the materials listed above as the dielectric ceramic can be used as the dielectric ceramic that is the main component of the ceramic sheets 101, 102, and 103. The additive preferably contains silicon (Si) exemplified as the accessory component described above. Furthermore, the additive may contain at least one of the rare earth elements or alkaline earth metal elements listed as the accessory component above.

In the present embodiment, when the concentration of the B-site element of the dielectric ceramic is defined as 100 atm %, the content of Si in the cover ceramic sheet 103 is 0.1 atm % to 2.5 atm %. This configuration makes it possible to adjust the sinterability of the ceramic body 11 in the firing process described later and segregate a large number of the small grains 21a containing Si. The content of other additives can be appropriately adjusted in consideration of the sinterability of the ceramic body 11 and the like.

The thickness of each of the ceramic sheets 101 and 102 is adjusted according to the thickness of the ceramic layer 18 after firing. The thickness of the ceramic sheet 103 is appropriately adjusted according to the thickness of the cover portion 17 after firing.

As illustrated in FIG. 8A and FIG. 8B, unfired first internal electrode patterns 112 corresponding to the first internal electrodes 12 are formed on the first ceramic sheet 101, and unfired second internal electrode patterns 113 corresponding to the second internal electrodes 13 are formed on the second ceramic sheet 102. The internal electrode patterns 112 and 113 can be formed by printing conductive paste on the ceramic sheets 101 and 102. As illustrated in FIG. 8C, no internal electrode pattern is formed on the cover ceramic sheet 103.

On each of the ceramic sheets 101, 102, and 103, cut lines Lx and Ly for separating the multilayer sheet into individual ceramic bodies 11 are indicated. Each of the internal electrode patterns 112 and 113 is formed in a rectangular shape extending across one cut line Ly, for example. However, the second internal electrode pattern 113 is formed so as to be shifted from the first internal electrode pattern 112 by one chip in the X-axis direction or the Y-axis direction.

(Step S02: Stacking)

In step S02, the ceramic sheets 101, 102, and 103 are stacked as illustrated in FIG. 9, to produce a multilayer sheet 104.

In the multilayer sheet 104 illustrated in FIG. 9, the ceramic sheets 101 and 102 forming the electrode-stacking portion 16 are alternately stacked, and the cover ceramic sheets 103 are stacked above and below the stacked ceramic sheets 101 and 102 in the Z-axis direction. These ceramic sheets 101, 102, and 103 are integrated by being pressure-bonded. The number of the ceramic sheets 101, 102, and 103 is not limited to the example illustrated in FIG. 9.

(Step S03: Cutting)

In step S03, the unfired ceramic body 11 is produced by cutting the multilayer sheet 104 along the cut lines Lx and Ly.

(Step S04: Firing)

In step S04, the unfired ceramic body 11 is sintered. Thereby, the ceramic body 11 illustrated in FIG. 1 to FIG. 3 is produced. The firing can be performed, for example, in a reducing atmosphere or in a low oxygen partial pressure atmosphere.

In the present embodiment, by adjusting the firing conditions, the small grains 21a having a number ratio of 40% or greater and 95% or less to the crystal grains 20 can be formed in the end sections 171. For example, the number of the small grains 21a can be increased by maintaining a low firing temperature for a short period of time and rapidly lowering the temperature. A specific firing temperature, temperature increase rate, and temperature decrease rate can be adjusted according to the composition of the ceramic slurry used for the ceramic body 11. As an example, when barium calcium titan zirconate is used as the dielectric ceramic, the firing temperature is about 1250 to 1300° C., and the oxygen partial pressure in the maximum temperature range is about $10^{-11}$ to $10^{-10}$ (atm), the firing temperature is maintained for about 5 seconds to 1 minute, and then the firing temperature is lowered. For example, the temperature increase rate and the temperature decrease rate can be adjusted to be between 50 and 150° C./min.

(Step S05: Forming of External Electrodes)

In step S05, the external electrodes 14a and 14b are formed on the respective ends of the fired ceramic body 11 in the X-axis direction to fabricate the multilayer ceramic capacitor 10 illustrated in FIG. 1 to FIG. 3.

For example, conductive pastes are applied to respective ends of the ceramic body 11 in the X-axis direction and baked to form the base layers 144. The conductive paste can be applied by dipping, printing, or the like. The plated layer 145 can be formed by forming one or more plated films on the base layer 144. Each plated film can be formed by, for example, electrolytic plating.

Through the above steps, the multilayer ceramic capacitor 10 illustrated in FIG. 1 to FIG. 3 is manufactured. Note that the manufacturing method in the present embodiment is not limited to the above example. For example, the application of the conductive paste in step S05 may be performed before the firing process in step S04. In this case, the base layer 144 can be formed at the same time as the sintering of the ceramic body 11.

In the present embodiment, even when hydrogen generated through the forming of the plated layer 145 is occluded in the external electrodes 14, a large number of the small grains 21a are segregated in the end sections 171 of the cover portion 17, and therefore, diffusion of hydrogen to the electrode-stacking portion 16 can be inhibited. Therefore, deterioration in reliability of the multilayer ceramic capacitor 10 can be suppressed.

EXAMPLES AND COMPARATIVE EXAMPLES

Examples and comparative examples of the above embodiment will be described. In examples 1 to 8, samples of the multilayer ceramic capacitor were fabricated under the condition that the small-grain number ratio in the cross section of the end section of the cover portion was 40% or greater and 95% or less of the number of the crystal grains. In comparative examples 1 and 2, samples of the multilayer ceramic capacitor were fabricated under the condition that the small-grain number ratio was less than 40%. The small-grain number ratio was adjusted by the composition of the cover portion, the firing temperature, and the time for maintaining the firing temperature.

In examples 1 to 8 and comparative examples 1 and 2, the size of the sample of the multilayer ceramic capacitor was 1.0 mm×0.5 mm×0.5 mm. The dimension of each cover portion in the Z-axis direction was 80 μm. In addition, in examples 1 to 8 and comparative examples 1 and 2, configurations other than the small-grain number ratio in the samples of the multilayer ceramic capacitor were substantially the same.

Example 1

In example 1, first and second ceramic sheets on which conductive pastes are printed and a cover ceramic sheet without printed conductive paste were prepared. The cover ceramic sheet contained a dielectric ceramic as a main component and additives. Barium calcium titanate zirconate containing Ba, Ca, Ti and Zr((Ba, Ca)(Ti, Zr)O$_3$, BCTZ) was used as the main component dielectric ceramic. In this dielectric ceramic, the ratio of the sum of Ba and Ca atoms to the sum of Ti and Zr atoms ((Ba+Ca)/(Ti+Zr)) was 0.997. The additives contained Ca, Zr, Ho, Mg, Mn, V, and Si. As presented in Table 1, when the content of (Ti+Zr) is defined as 100 atm %, the content of Mg was 1.5 atm % and the content of Si was 1.0 atm %.

These ceramic sheets were stacked and pressure-bonded to produce a multilayer sheet as illustrated in FIG. 9, and the multilayer sheet was cut to fabricate an unfired ceramic body. Subsequently, the unfired ceramic body was fired. In the firing process, as presented in Table 1, the firing temperature was 1260° C., and the time for maintaining the firing temperature was 0.1 minute. Then, by forming a base layer and a plated layer, external electrodes as illustrated in FIG. 1 to FIG. 3 were formed. Through the above process, the sample of example 1 was fabricated.

Example 2

As presented in Table 1, a sample of example 2 was fabricated in the same manner as in example 1 except that the content of Mg was 1.0 atm % when the content of (Ti+Zr) is defined as 100 atm % for the additive of the cover ceramic sheet.

Example 3

As presented in Table 1, a sample of example 3 was fabricated in the same manner as in example 1 except that the content of Si was 1.5 atm % when the content of (Ti+Zr) is defined as 100 atm % for the additive of the cover ceramic sheet, and the firing temperature was 1250° C.

Example 4

As presented in Table 1, a sample of example 4 was fabricated in the same manner as in example 1 except that Mg was not added as an additive to the cover ceramic sheet and the firing temperature was 1250° C.

Comparative Example 1

As presented in Table 1, a sample of comparative example 1 was fabricated in the same manner as in example 1 except that the time for maintaining the firing temperature was 12 minutes.

Example 5

A sample of example 5 was fabricated in the same manner as in example 1 except that the composition of the cover ceramic sheet and the firing temperature were different from those in example 1.

In example 5, the cover ceramic sheet corresponding to the cover portion contained barium titanate (BaTiO$_3$, BT) containing Ba and Ti as the main component dielectric ceramic. In this dielectric ceramic, the ratio of the number of Ba atoms to the number of Ti atoms (Ba/Ti) was 0.998. The additive of the cover ceramic sheet contained Ho, Mg, Mn, V, and Si. As presented in Table 1, the content of Mg was 1.5 atm % and the content of Si was 1.0 atm % when the content of Ti is defined as 100 atm %. In example 5, the firing temperature was 1275° C.

Example 6

As presented in Table 1, a sample of example 6 was fabricated in the same manner as in example 5 except that the content of Mg was 1.0 atm % when the content of Ti is defined as 100 atm % for the additive of the cover ceramic sheet.

Example 7

As presented in Table 1, a sample of example 7 was fabricated in the same manner as in example 5 except that the content of Si was 1.5 atm % when the content of Ti is defined as 100 atm % for the additive of the cover ceramic sheet and the firing temperature was 1260° C.

Example 8

As presented in Table 1, a sample of example 8 was fabricated in the same manner as in example 5 except that Mg was not added as an additive to the cover ceramic sheet and the firing temperature was 1260° C.

Comparative Example 2

As presented in Table 1, a sample of comparative example 2 was fabricated in the same manner as in example 5 except that the time for maintaining the firing temperature was 12 minutes.

TABLE 1

| | Main component of the cover portion | Additives in the cover portion (atm %) | | Firing temperature | Time for maintaining the firing temperature |
|---|---|---|---|---|---|
| | | Mg | Si | | |
| Example 1 | BCTZ | 1.5 | 1.0 | 1260° C. | 0.1 min |
| Example 2 | | 1.0 | 1.0 | 1260° C. | 0.1 min |
| Example 3 | | 1.5 | 1.5 | 1250° C. | 0.1 min |
| Example 4 | | 0.0 | 1.0 | 1250° C. | 0.1 min |
| Comparative example 1 | | 1.5 | 1.0 | 1260° C. | 12 min |
| Example 5 | BT | 1.5 | 1.0 | 1275° C. | 0.1 min |
| Example 6 | | 1.0 | 1.0 | 1275° C. | 0.1 min |
| Example 7 | | 1.5 | 1.5 | 1260° C. | 0.1 min |
| Example 8 | | 0.0 | 1.0 | 1260° C. | 0.1 min |
| Comparative example 2 | | 1.5 | 1.0 | 1275° C. | 12 min |

TABLE 2

| | Average grain size of crystal grains (nm) | Small-grain number ratio (%) | IR deterioration start time (hour) |
|---|---|---|---|
| Example 1 | 223 | 72 | 3350 |
| Example 2 | 341 | 88 | 2002 |
| Example 3 | 177 | 94 | 3455 |
| Example 4 | 479 | 40 | 2120 |
| Comparative example 1 | 231 | 0 | 927 |
| Example 5 | 239 | 76 | 3120 |
| Example 6 | 352 | 60 | 2280 |
| Example 7 | 197 | 90 | 3560 |
| Example 8 | 488 | 74 | 2460 |
| Comparative example 2 | 284 | 0 | 880 |

(Average Grain Size of Crystal Grains)

Each sample of the examples and the comparative examples was polished to expose a cross section parallel to the X-Z plane and passing through the central part of the multilayer ceramic capacitor in the Y-axis direction. Subsequently, using an SEM, the cross section was magnified 30,000 to 50,000 times, and an observation target region containing 50 or more crystal grains was imaged. The observation target region was located at a position corresponding to the section R1. That is, the position of the observation target region was the central portion in the Z-axis direction between the end portion of the external electrode in the X-axis direction and the electrode-stacking portion in the cover portion. Then, the average grain size of 50 crystal grains included in this observation target region was calculated according to the "method for calculating the number ratio of small grains" described above. The results are presented in Table 1.

As presented in Table 2, in examples 1 to 8 and comparative examples 1 and 2, the average grain size of the crystal grains in the cross section of the end section was 50 nm or greater and 500 nm or less. Among examples 1 to 8, in examples 1, 4, 6, and 8, the average grain size of the crystal grains was 170 nm or greater and 250 nm or less.

(Calculation of Small-Grain Number Ratio)

Using the image of the observation target region of each sample, the ratio of the number of small grains to the number of crystal grains (small-grain number ratio) was calculated according to the "method for calculating the number ratio of small grains" described above.

First, the number of crystal grains in the observation target region was calculated. Subsequently, the grain size of each segregated grain located within the same observation target region was calculated based on the method of calculating a grain size described above. Among the segregated grains for which the grain size was calculated, the number of small grains having a grain size of 0.5% or greater and 10% or less of the average grain size of the crystal grains was counted. Then, the ratio of the number of small grains (the number of small grains/the number of crystal grains× 100) when the number of crystal grains in the observation target region is defined as 100% was calculated as the "small-grain number ratio". The results are presented in Table 2.

As presented in Table 2, in all examples 1 to 8, the small-grain number ratio was 40% or greater and 95% or less. On the other hand, in comparative examples 1 and 2, the small-grain number ratio was 0%.

(High Temperature Load Test)

Subsequently, a voltage twice the rated voltage was applied at 125° C. to samples of examples 1 to 8 and comparative examples 1 and 2, and the time until the leakage current value increased by 20% or greater from the start of measurement (insulation resistance (IR) deterioration start time) was measured. The results are presented in Table 2.

As presented in Table 2, in comparative examples 1 and 2 in which the small-grain number ratio was 0%, the IR deterioration start time was 1000 hours or less. In contrast, in all examples 1 to 8 in which the small-grain number ratio was 40% or greater and 95% or less, the IR deterioration start time was 2000 hours or greater. From this, it was found that the start of IR deterioration can be delayed even under severe conditions by adjusting the small-grain number ratio in the end section to be 40% or greater and 95% or less.

Furthermore, among examples 1 to 8, in examples 1, 4, 6, and 8 in which the average grain size of the crystal grains was 170 nm or greater and 250 nm or less, the IR deterioration start time was 3000 hours or greater. From this, it was found that the start of IR deterioration can be further delayed by adjusting the average grain size of the crystal grains in the end section to be 170 nm or greater and 250 nm or less.

Other Embodiments

Although the embodiment of the present invention has been described in detail above, the present invention is not limited to the specific embodiment, and various modifications and changes can be made within the scope of the gist of the present invention described in the claims.

In the first embodiment, the configuration for inhibiting diffusion of hydrogen released from the external electrode 14 to the first end section 171 of the cover portion 17 has been mainly described. On the other hand, as illustrated in FIG. 3, the side margin portion 15 also includes a second end section 151 located between the second extending portion 143 of the external electrode 14 and the electrode-stacking portion 16, and is likely to serve as a hydrogen migration path. Therefore, by adjusting the small-grain number ratio in the cross section of the second end section 151 of the side margin portion 15, the diffusion of hydrogen released from the external electrode 14 to the second end section 151 of the side margin portion 15 is inhibited.

Specifically, in the cross section of the second end section 151 of the side margin portion 15, the number of the small grains 21a having a grain size of 0.5% or greater and 10% or less of the average grain size of the crystal grains 20 among the segregated grains 21 is preferably 40% or greater and 95% or less of the number of the crystal grains 20. As a result, diffusion of hydrogen can be inhibited in the second end section 151, and a decrease in insulation resistance can be inhibited.

In this example, the multilayer ceramic capacitor 10 may be manufactured by a method in which the side margin portions 15 are attached afterward. That is, after separating the multilayer body of ceramic sheets corresponding to the electrode-stacking portion 16 and the cover portions 17 into individual multilayer bodies, the unfired side margin portions 15 are formed on respective sides of the separated multilayer body in the Y-axis direction. By applying such a manufacturing method, it becomes easy to adjust the composition of the side margin portion 15.

Furthermore, by adjusting the small-grain number ratio to be 40% or greater and 95% or less in the cross sections of both the first end section 171 of the cover portion 17 and the second end section 151 of the side margin portion 15, a decrease in insulation resistance can be further reduced.

The configuration of the external electrode 14 is not limited to the above example, and for example, the first extending portion 142 may be formed only on one of the first principal surface M1 and the second principal surface M2. Also, the external electrodes 14 may not be necessarily formed on the side surfaces S1 and S2.

In the above embodiment, the multilayer ceramic capacitor 10 has been described as an example of the multilayer ceramic electronic component, but the present embodiment is applicable to general multilayer ceramic electronic components having a pair of external electrodes. Examples of such multilayer ceramic electronic components include chip varistors, chip thermistors, and multilayer inductors.

What is claimed is:

1. A multilayer ceramic electronic component comprising:
a ceramic body including an electrode-stacking portion and first and second cover portions, the electrode-stacking portion including ceramic layers stacked in a first axis direction and internal electrodes disposed between the ceramic layers, the first and second cover portions facing each other in the first axis direction with the electrode-stacking portion interposed therebetween; and
first and second external electrodes, each of the first and second external electrodes including a covering portion that covers the ceramic body from a second axis direction orthogonal to the first axis direction, and an extending portion that extends over at least one of the first and second cover portions along the second axis direction, wherein the ceramic body includes crystal grains of ceramic and segregated small grains located between the crystal grains, wherein at least one of the first and second cover portions includes an end section located between the extending portion and the electrode-stacking portion, and wherein in a cross section of the end section, the number of the segregated small grains is 40% or greater and 95% or less of the number of the crystal grains, each of the segregated small grains being defined as a grain having a grain size of 0.5% or greater and 10% or less of an average grain size of the crystal grains in the cross section.

2. The multilayer ceramic electronic component according to claim 1, wherein the segregated small grains contain silicon.

3. The multilayer ceramic electronic component according to claim 2, wherein the segregated small grains further contain at least one of a rare earth element or an alkaline earth metal element.

4. The multilayer ceramic electronic component according to claim 1, wherein the segregated small grains are present at triple points formed by three of the crystal grains.

5. The multilayer ceramic electronic component according to claim 1, wherein an average grain size of the crystal grains in the cross section of the end section is 50 nm or greater and 500 nm or less.

6. The multilayer ceramic electronic component according to claim 5, wherein the average grain size of the crystal grains in the cross section of the end section is 170 nm or greater and 250 nm or less.

7. The multilayer ceramic electronic component according to claim 1, wherein the number of the segregated small grains per unit area in a cross section of the ceramic layer in the electrode-stacking portion is smaller than the number of the segregated small grains per unit area in the cross section of the end section.

8. The multilayer ceramic electronic component according to claim 1, wherein at least one of the first and second cover portions includes a central section located between the first and second external electrodes in the second axis direction, and wherein in a cross section of the central section, an average grain size of the crystal grains in a surface layer portion in the first axis direction is larger than an average grain size of the crystal grains in a central portion in the first axis direction.

9. The multilayer ceramic electronic component according to claim 1, wherein at least one of the first and second cover portions includes a central section located between the first and second external electrodes in the second axis direction, and wherein in a cross section of the central section, the number of the segregated small grains per unit area in a surface layer portion in the first axis direction is less than the number of the segregated small grains per unit area in a central portion in the first axis direction.

10. The multilayer ceramic electronic component according to claim 1, wherein the crystal grains contain barium and titanium.

11. The multilayer ceramic electronic component according to claim 1, wherein the crystal grains contain at least one of calcium or zirconium.

12. A multilayer ceramic electronic component comprising:

a ceramic body including an electrode-stacking portion and first and second side margin portions, the electrode-stacking portion including ceramic layers stacked in a first axis direction and internal electrodes disposed between the ceramic layers, the first and second side margin portions facing each other in a second axis direction orthogonal to the first axis direction with the electrode-stacking portion interposed therebetween; and first and second external electrodes each including a covering portion that covers the ceramic body from a third axis direction orthogonal to the first and second axis directions, and an extending portion that extends over at least one of the first and second side margin portions along the third axis direction, wherein the ceramic body contains crystal grains of ceramic and segregated small grains located between the crystal grains, wherein at least one of the first and second side margin portions includes an end section located between the extending portion and the electrode-stacking portion, and wherein in a cross section of the end section, the number of the segregated small grains is 40% or greater and 95% or less of the number of the crystal grains, each of the segregated small grains being defined as a grain having a grain size of 0.5% or greater and 10% or less of an average grain size of the crystal grains in the cross section.

13. The multilayer ceramic electronic component according to claim 1, wherein the ceramic body further includes first and second side margin portions, the first and second side margin portions facing each other in a third axis direction orthogonal to the first and second axis directions with the electrode-stacking portion interposed therebetween; and wherein the first and second external electrodes each further include another extending portion that extends over at least one of the first and second side margin portions along the second axis direction, wherein at least one of the first and second side margin portions includes an end section located between said another extending portion and the electrode-stacking portion, and wherein in a cross section of the end section of the at least one of the first and second side margin portions, the number of the segregated small grains is 40% or greater and 95% or less of the number of the crystal grains, each of the segregated small grains being defined as a grain having a grain size of 0.5% or greater and 10% or less of an average grain size of the crystal grains in the cross section.

* * * * *